United States Patent [19]
Diebel et al.

[11] Patent Number: 6,041,851
[45] Date of Patent: *Mar. 28, 2000

[54] SWITCHGEAR CABINET AIR-CONDITIONING ARRANGEMENT

[75] Inventors: Michael Diebel, Dillenburg; Achim Edelmann, Wilusdorf-Wilden; Markus Hain, Dillenburg, all of Germany

[73] Assignee: Rittal-Werk Rudolf Loh GmbH Co. KG, Herborn, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,704

[22] Filed: Mar. 12, 1997

[30] Foreign Application Priority Data

Mar. 13, 1996 [DE] Germany .............................. 196 09 651

[51] Int. Cl.$^7$ ...................................................... F28D 15/00

[52] U.S. Cl. .................................... 165/104.33; 165/80.3; 361/384; 312/236

[58] Field of Search ............................... 165/48.1, 104.33, 165/104.34, 223, 80.3; 62/180; 236/49.3; 312/236; 361/384

[56] References Cited

U.S. PATENT DOCUMENTS

| | | | |
|---|---|---|---|
| 3,387,648 | 6/1968 | Ward, Jr. et al. | 165/104.33 |
| 3,754,596 | 8/1973 | Ward, Jr. | 165/104.34 |
| 4,139,057 | 2/1979 | Klaar | 165/104.34 |
| 4,449,579 | 5/1984 | Miyazaki et al. | 165/104.33 |
| 4,528,614 | 7/1985 | Shariff et al. | 165/104.33 |
| 4,911,231 | 3/1990 | Horne et al. | 165/104.33 |
| 4,949,218 | 8/1990 | Blanchard et al. | 165/104.33 |
| 5,035,281 | 7/1991 | Neuenfeldt et al. | 165/104.33 |
| 5,127,233 | 7/1992 | Coffield | 62/92 |
| 5,203,178 | 4/1993 | Shyu | 62/180 |
| 5,333,676 | 8/1994 | Mizuno | 165/104.33 |
| 5,365,749 | 11/1994 | Porter | 165/104.33 |

Primary Examiner—Ira S. Lazarus
Assistant Examiner—Terrell McKinnon
Attorney, Agent, or Firm—Jansson, Shupe, Bridge & Munger, Ltd.

[57] ABSTRACT

The invention relates to a switchgear cabinet air conditioning arrangement, having a central control arrangement as well as sensors communicating therewith and air conditioning components. Numerous air conditioning "strategies" are made possible, and hence an adaptation to variable conditions of use, are achieved by the measures where various air conditioning components are disposed at various locations in the switchgear and are controlled or regulated by means of the central control arrangement in dependence on sensor signals and/or adjustable or programmable controls.

10 Claims, 2 Drawing Sheets

SWITCHGEAR CABINET AIR-CONDITIONING ARRANGEMENT

RELATED APPLICATION

This application claims priority from German patent application no. 196 09 651.0-42 filed on Mar. 13, 1996.

FIELD OF THE INVENTION

This invention relates generally to heat exchange and temperature regulation and, more particularly, to an air conditioning arrangement for a switchgear cabinet.

BACKGROUND OF THE INVENTION

Electrical and/or electronic components and systems are often mounted in cabinets which may be referred to as switchgear cabinets. Simply because such components are electrical in nature, they evidence energy losses manifested as heat. And heat causes the temperature of such components and systems to rise, sometimes to an undesirable or intolerable level.

While most electrical and electronic components and systems are designed to operate at a temperature above room ambient, there is also an upper limit to such temperature. And depending upon the size and number of components and systems in a particular switchgear cabinet and the "duty cycle" at which such components and systems are operated at or near their rated outputs, additional cooling may be required.

An air conditioning arrangement for a switchgear cabinet having a cooling apparatus, a control arrangement and sensors, is described in DE 38 11 189 C2. In this known switchgear cabinet air conditioning arrangement, the cooling apparatus is switched-on and switched-off both on the basis of the signals from temperature sensors and on the basis of the signal from a moisture/humidity sensor.

In an air conditioning arrangement disclosed in EP 0 381 592 A2, a plurality of heat exchanger devices are provided, which are supplied from a common coolant tank. The coolant can be conducted to a plurality of heat generators by means of a control arrangement.

An alternative air conditioning arrangement is described in DE 43 37 692 A1, wherein a cooling effect, corresponding to the quantity of heat generated by an electronic apparatus, can be produced both from n cooling units and from n+1 cooling units so that, with n+1 cooling units, each cooling unit has an adequate reserve. In known switchgear cabinet air conditioning arrangements, those air conditioning components which control cabinet interior temperature are often mounted inside the switchgear cabinet.

While the earlier arrangements have been generally satisfactory for the intended purpose, they lack the capability to implement any one or more of several control "strategies" for cabinet temperature regulation. That is, such earlier arrangements are understood to be incapable of controlling temperature on the basis of, e.g., time, loading of the electrical components/systems in the cabinet (as evidenced by the current drawn thereby), humidity, normal and emergency operating circumstances, efficiency (energy conservation), noise level and other parameters.

OBJECTS OF THE INVENTION

It is an object of this invention to provide an air conditioning arrangement for a switchgear cabinet that overcomes some of the problems and shortcomings of the prior art.

Another object of this invention is to provide a switchgear cabinet air conditioning arrangement, that allows the air conditioning of the switchgear cabinet to be adjustably controllable.

Another object of this invention is to provide an air conditioning arrangement for a switchgear cabinet that results in a more energy-efficient operation.

Still another object of this invention is provide an air conditioning arrangement for a switchgear cabinet that results in a noise-optimized operation. How these and other objects are accomplished will become apparent from the following descriptions and from the drawings.

SUMMARY OF THE INVENTION

The invention involves an air conditioning arrangement for a switchgear cabinet comprised of a central control unit, a plurality of sensors interfaced with the central control unit, and a plurality of cooling components, controllable by the central control unit, disposed at various locations in the switchgear cabinet is such a way that they provide air conditioning for a plurality of electrical assemblies.

Such configuration for the air conditioning arrangement permits numerous influences to be made on the air conditioning operations internally of the switchgear cabinet. Thus, the air conditioning is accomplished in an optimum manner in dependence on many variable conditions and is adaptable to variable conditions of use.

In a preferred embodiment of the invention, components involved in the switchgear cabinet air conditioning arrangement include at least two components selected from the group comprised of a cooling apparatus, a heating system, a heat exchanger, and a fan. In such case, the various cooling components already permit a number of control variants, and hence air conditioning possibilities, because of the different combinations.

In another preferred embodiment, the switchgear arrangement is configured so that at least one equipment of the group of equipment comprising one heat exchanger, one fan, and one heating system can be actuated for "local" air conditioning, i.e., for air conditioning in the region immediately adjacent to a specific electrical assembly. And at lest one cooling component may be actuated only at "global" temperature peaks, i.e., temperature peaks which are measured in view of localized "spot" temperatures at locations around the inside of the cabinet. Local and global air conditioning is hereby rendered possible internally of the switchgear cabinet.

Even when electrical units in the cabinet are in operation at their lowest level, some amount of heat is thereby created. This is referred to as the thermal base load. From the point of view of energy-optimized operation, in this embodiment, it is advantageous for at least one heat exchanger to be actuatable to lower the thermal base load.

It is also worthwhile to provide the capability to minimize the degree to which noise resulting from the operation of the switchgear cabinet is disturbing to persons nearby. In a highly preferred embodiment of the invention, the central control unit controls the cooling components at an optimum control unit for energy conservation. In this embodiment, the control unit has at least one sensor, the signal of which represents noise, and the control unit controls the cooling components for noise minimization. In a another version of this embodiment, using a specific control strategy, the noise-optimized operation is or is not used, depending upon the time of day and day of week. For example, if people are near the cabinet only during normal business hours and normal business days, the control strategy uses noise-based control during such hours and days and some other basis for control at other times and days.

In still another version of the highly preferred embodiment, the switchgear cabinet air conditioning arrangement operates at a desired temperature that is lower than an operating temperature encountered during normal operations. In this version, the cooling components include at least one internal fan and at least one external fan. The internal fan operates at a first noise level and a first speed higher than its normal operating speed and the external fan operates at a second noise level and a second speed lower than its normal operating speed. The relationship of the noise levels of the internal and external fan is such that the first noise level of the internal fan is quieter than the second noise level of the external fan. Also in this version, the cooling apparatus is operable both when a heat exchanger is provided and also when a cooling apparatus is provided.

In yet another embodiment of the invention, an emergency operation is provided in the central control unit to permit air conditioning to be maintained for as long as possible in an emergency operation. This emergency operation is energy-optimized such that the desired temperature is increased and higher "threshold temperatures," i.e., that temperature at which air conditioning begins, are permitted during emergency operation.

In another preferred embodiment of the invention, the central control unit includes a detection stage and an advanced operation which anticipates temperature rise and commences air conditioning operations in advance of the actual rise in temperature. In this embodiment, sensors connected to the arrangement microprocessor or computer can be used to detect a recurring function, e.g., the startup of a particular electrical unit (as evidenced by the sudden rise in the electrical current drawn by such unit), and initiate air conditioning based upon the recurrence of such function. In such embodiment, the advanced operation may be selectable by means of the detection stage which is time based. In a specific version of this embodiment, the detection stage is based on supplied current.

In yet another embodiment of the invention, the sensors have at least one air-moisture sensor and the quantity of air in the internal circuit can be reduced at the cooling apparatus.

The invention will be described further, by way of example with reference to the embodiment of the accompanying drawings in which:

DETAILED DESCRIPTIONS OF THE PREFERRED EMBODIMENTS

Figure 1:
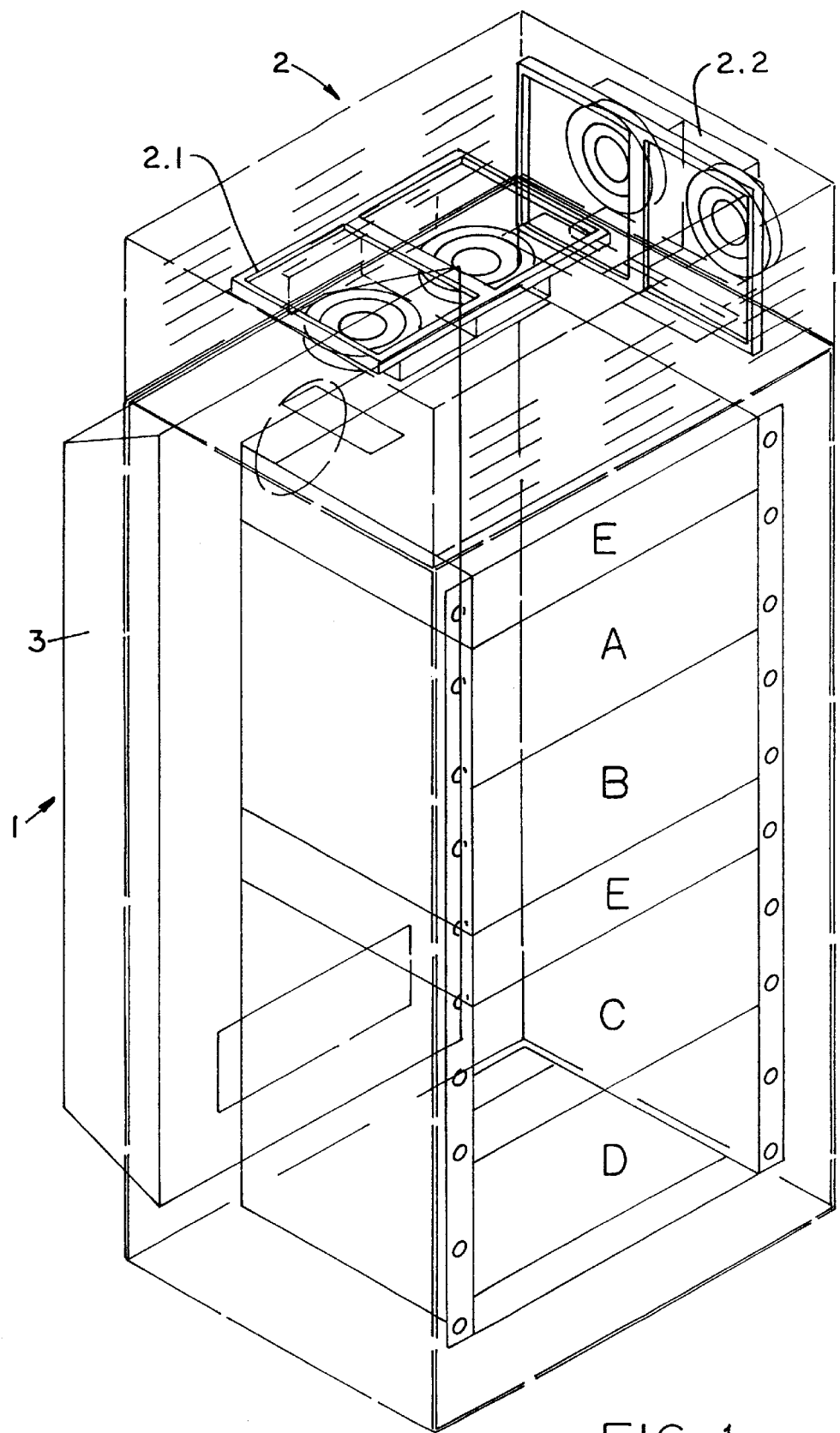
FIG. 1 illustrates a switchgear cabinet having air conditioning components mounted in and on such cabinet and built-in electrical/electronic units which are to be cooled.

FIG. 1 illustrates a switchgear cabinet 1 having a first air conditioning apparatus 2 mounted on the top and an additional air conditioning apparatus 3 disposed on the rear side. The interior of the switchgear cabinet 1 accommodates a plurality of built-in units A, B, C and D with electrical or electronic assemblies as well as two slide-in fans E. In the first air conditioning apparatus 2, an external fan 2.1 is shown for the external air current/flow and internal fan 2.2 is shown for the internal air current/flow.

Figure 2:
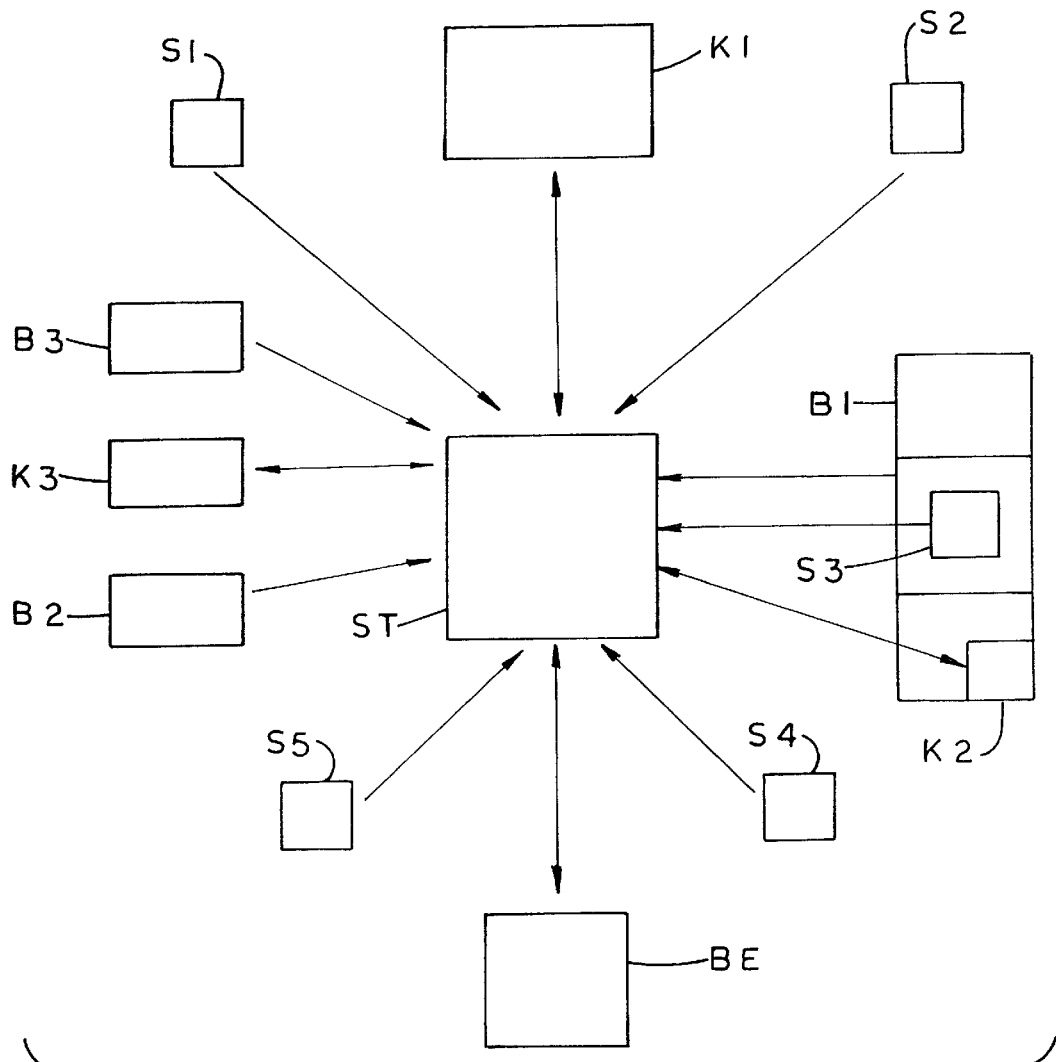
FIG. 2 is a schematic view of the switchgear cabinet air conditioning arrangement.

FIG. 2 is by way of example, a block circuit diagram of the basic construction for a switchgear cabinet air conditioning arrangement. A computer/microprocessor-based central control unit or arrangement ST receives sensor signals from a plurality of sensor elements S1 to S5 and communicates with a plurality of air conditioning components K1 to K3, at least some of which are variable or adjustable. The air conditioning components K1 to K3 serve to cool assemblies B1 to B3, or respectively to air condition the cabinet interior. One or more heating systems may also be provided to heat such interior. In order to permit adjustments, e.g., programming, to be effected on the central control arrangement ST, and in order to gain an insight into operational states of the central control arrangement ST, an operating arrangement BE is provided.

The sensors S1 to S5 are placed at suitable locations in the interior of the switchgear cabinet 1 in order to obtain both local evidence or information, detailed at important locations, and global evidence or information concerning the general air conditioning state in the switchgear cabinet 1. As the right-hand side of FIG. 2 illustrates, a sensor may also be disposed in an assembly B1 for such purpose. The sensors S1 to S5 have a plurality of temperature sensors, advantageously at least one moisture/ humidity sensor and possibly also one current-measuring sensor, by means of which the input current, required in the switchgear cabinet 1, or even the input current of individual assemblies B1 to B3 can be detected.

Both passive components, such as air/air heat exchangers or air/water heat exchangers for example, and active components, such as cooling apparatuses and heating systems for example, are involved as air conditioning components K1 to K3. In particular, assemblies can be cooled locally by means of fans, so that an energy-optimized adaptation of the cooling arrangement is rendered possible. In such case, air baffles may also be provided for the guidance of the air flow in order to effect an appropriate ventilation.

On the basis of the received sensor signals and/or adjustable or programmable controls, the individual cooling components can be controlled by means of the central control arrangement ST according to a priority distribution, which is dependent on the place of use and purpose. Temperature peaks, for example, are avoided because the fans are appropriately distributed in the switchgear cabinet, without additional air conditioning being required. Only necessary regions are in each case appropriately air conditioned by means of the sensor signals. Regulating criteria may be, for example, the extreme temperature, the cooling below the condensation point, and the like.

Various modes of operation may be selected by means of the control arrangement ST. In such case, a standard operation is preferably efficiency or energy-optimized. The switchgear cabinet 1 should be operated in a specific air conditioning and temperature range, whereby as high a degree of efficiency as possible is to be ensured. For such purpose, only the directly required air conditioning components, e.g., fans, are operated in the optimum speed range. The cooling apparatus 2, 3 are additionally used only at temperature peaks. The thermal base load is eliminated via the heat exchanger with greater efficiency. Heating is effected if required.

The air conditioning components 2, 3, E, K1 to K3 are controlled according to threshold values, which are dependent on the time of day, during a noise-optimized operation which is also provided. In order to permit these threshold values to be maintained, higher threshold temperatures are to be accepted in the cabinet for the period of lowest threshold values (at night), and the efficiency of the air conditioning is allowed to drop. In order to avoid temperature and noise peaks, the desired temperature is set lower, and advance cooling is effected. To achieve this, the quieter internal fans of the internal circuit relative to the louder external fans are operated at a proportionally higher speed than is the case during standard operation. In order to avoid higher speeds for the external fans, two external fans may be provided, for example. If both a heat exchanger and a cooling apparatus are provided, the quieter cooling apparatus is intensively operated.

Only the DC fans, for example, are ready for operation in an emergency operation which is also provided. The object to be achieved is an energy-optimized use, in order to burden the existing reserves as little as possible and to permit the emergency operation to be maintained for as long as possible. In such case, higher threshold temperatures are permitted, and the desired temperature is additionally increased. That is to say, in an emergency operation, the "set point" threshold temperature at which apparatus 2, 3, fans E, 2.1, 2.2, components K1, K2, K3 are operated may be increased above that threshold temperature established for normal operation. And the "set point" of the desired temperature may also be selected to be above that desired temperature set point used during normal operation.

An advance operation is also provided. Time-dependent, recurring operational cycles may be ascertained in a detection stage by means of a storage or memory component, for example by correlation, in order to use the air conditioning in anticipation of heat rise so as to avoid extreme temperatures. In such case, the advance operation may also be controlled in dependence on the current supplied because of the increased power loss occurring thereby.

The air moisture/humidity in the switchgear cabinet 1 can be ascertained by means of a moisture/humidity sensor, and the quantity of air in the internal circuit can be reduced in order to achieve an appropriate degree of dryness for the internal air.

In consequence, the described measures permit numerous possibilities for the air conditioning to be adapted to variable conditions, so that an optimum operation of the switchgear cabinet is rendered possible under quite different conditions of use.

While the principles of this invention have been described in connection with specific embodiments, it should be understood clearly that these descriptions are made only by way of example and are not intended to limit the scope of the invention.

What is claimed:

1. An air conditioning arrangement for a switchgear cabinet containing a plurality of electrical/electronic assemblies, the air conditioning arrangement comprising:
   a central control unit;
   at least one air conditioning apparatus external to the cabinet;
   a plurality of sensors at different, respective locations in the cabinet, said sensors each interfaced with the central control unit, such plurality of sensors including at least two temperature sensors and at least one moisture sensor; and
   a plurality of individual cooling components disposed at respective locations in the switchgear cabinet, said cooling components each separately controlled by the central control unit in response to signals received from at least one of the sensors, the cooling components including at least one fan and at least one cooling component selected from the group consisting of a cooling apparatus and a heat exchanger, thereby providing both global and localized air conditioning as needed for the plurality of electrical assemblies within the switchgear cabinet.

2. The switchgear-cabinet air conditioning arrangement of claim 1 further including a heating device within the cabinet, said heating device separately controlled by the central control unit in response to signals received from at least one of the sensors.

3. The switchgear-cabinet air conditioning arrangement of claim 1 wherein at least one of the cooling components of the group of components comprising the cooling apparatus and the fan is actuated only at peak temperatures.

4. The switchgear-cabinet air conditioning arrangement of claim 1 wherein the heat exchanger is actuatable to lower the thermal base load.

5. The switchgear-cabinet air conditioning arrangement of claim 1 wherein:
   such cabinet is installed in a location occupied during regularly recurring time of day and day of week and wherein:
   the control unit has at least one sensor, the signal of which represents noise; and
   the control unit controls, by the time of day and the day of the week, the cooling components for noise minimization.

6. The switchgear-cabinet air conditioning arrangement of claim 5 wherein the noise-optimized operation is controlled by a timer set for the time of day and for the day of the week.

7. The switchgear-cabinet air conditioning arrangement of claim 5 wherein:
   the arrangement operates at a desired temperature that is lower than an operating temperature encountered during normal operations;
   the cooling components include at least one internal fan and at least one external fan;
   the internal fan operates at a first noise level and a first speed higher than its normal operating speed;
   the external fan operates at a second noise level and a second speed lower than its normal operating speed;
   the first noise level of the internal fan is less than the second noise level of the external fan; and
   the cooling apparatus is operable when a heat exchanger is provided.

8. The switchgear-cabinet air conditioning arrangement of claim 1 wherein:
   an emergency operation is provided in the central control unit;
   the emergency operation is energy-optimized;
   the desired temperature is increased in the emergency operation; and
   higher threshold temperatures are permitted during emergency operation.

9. The switchgear-cabinet air conditioning arrangement of claim 1 wherein:
   the central control unit includes a detection stage;
   an advanced operation which anticipates temperature rise is provided in the central control unit;
   the advanced operation is selectable by means of the detection stage; and
   the detection stage is time based.

10. The switchgear-cabinet air conditioning arrangement of claim 9 wherein:
    the central control unit includes a detection stage;
    an advanced operation which anticipates temperature rise is provided in the central control unit;
    the advanced operation is selectable by means of the detection stage; and
    the detection stage is based on electrical current.

* * * * *